US012687478B1

(12) United States Patent
Wang et al.

(10) Patent No.: US 12,687,478 B1
(45) Date of Patent: Jul. 21, 2026

(54) SYSTEM AND METHOD FOR ANALYZING SIZE DISTRIBUTION AND CHEMICAL COMPOSITION OF NEUTRAL CLUSTERS BELOW 3 NM

(71) Applicant: FUDAN UNIVERSITY, Shanghai (CN)

(72) Inventors: Lin Wang, Shanghai (CN); Runlong Cai, Shanghai (CN); Yueyang Li, Shanghai (CN); Yiliang Liu, Shanghai (CN); Jun Zheng, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 19/398,084

(22) Filed: Nov. 24, 2025

(30) Foreign Application Priority Data

Aug. 15, 2025 (CN) .......................... 202511148785.1

(51) Int. Cl.
| | |
|---|---|
| *G01N 15/02* | (2006.01) |
| *G01N 15/06* | (2006.01) |
| *G01N 15/10* | (2006.01) |
| G01N 15/00 | (2006.01) |

(52) U.S. Cl.
CPC ..... *G01N 15/0266* (2013.01); *G01N 15/0656* (2013.01); *G01N 15/10* (2013.01); *G01N 2015/0038* (2013.01); *G01N 2015/1029* (2024.01)

(58) Field of Classification Search
CPC .......... G01N 15/0266; G01N 15/0656; G01N 15/10; G01N 2015/0038; G01N 2015/1029
See application file for complete search history.

(56) References Cited

U.S. PATENT DOCUMENTS

| | | | | |
|---|---|---|---|---|
| 5,379,791 A | * | 1/1995 | Christopher | ......... G05D 7/0186 137/593 |
| 6,003,389 A | * | 12/1999 | Flagan | ............... G01N 15/0266 73/865.5 |
| 7,850,908 B1 | * | 12/2010 | Wick | ................... G01N 1/2273 422/50 |

* cited by examiner

*Primary Examiner* — Tarun Sinha
(74) *Attorney, Agent, or Firm* — IPRTOP LLC

(57) ABSTRACT

A system and method for analyzing the size distribution and chemical composition of neutral clusters below 3 nm, which achieves efficient sampling based on a core sampling method. The system utilizes the high charging efficiency of the unipolar charging device to charge the nanoparticles and efficiently transport them to the inlet of the nanoparticle electrical mobility size classification device. Through a specialized aerodynamic design, the nanoparticles pass through the electric field between the electrode plates and are efficiently transmitted to both the particle number concentration detector and the chemical composition detector, demonstrating excellent application prospects.

11 Claims, 5 Drawing Sheets

(a)

(b)

1

SYSTEM AND METHOD FOR ANALYZING SIZE DISTRIBUTION AND CHEMICAL COMPOSITION OF NEUTRAL CLUSTERS BELOW 3 NM

FIELD OF THE INVENTION

The present disclosure belongs to the technical field of analysis and testing, and relates to a system and method for analyzing the size distribution and chemical composition of neutral clusters below 3 nm, and specifically relates to a system and method for simultaneous measurement of the size and chemical composition of molecular clusters below 3 nm, which can be applied to aspects such as environmental monitoring, atmospheric scientific research, nanomaterial characterization, bioaerosol analysis, and ultrafine particle monitoring in industrial processes.

BACKGROUND OF THE INVENTION

The particle size, chemical composition, and spatial configuration of the particles below 3 nm (i.e., nanometer) have a decisive effect on their physical stability, chemical reaction activity, and environmental behavior. Due to the small size of the particles, experimental measurements of these properties still face many technical challenges. Currently, the measurement of particle size distribution and chemical composition of particles below 3 nm is performed separately, and each measurement step (including sampling, transport, charging, classification, and number concentration and chemical composition analysis) involves great uncertainty. Therefore, it is difficult to comprehensively and accurately characterize their properties.

Specifically, during the sampling and transport process, particles below 3 nm face an extremely high risk of diffusion loss. Owing to their very small size, they diffuse at a rapid rate, making particles near the tube wall highly susceptible to deposition losses.

During the charging process, neutral particles acquire charge through random collisions with ions. However, as particle size decreases, the probability of collisions between particles and ions diminishes, resulting in a significant reduction in the charging fraction. Conventional bipolar chargers exhibit limited charging efficiency for particles below 3 nm and are not suitable for measuring low concentrations of particles below 3 nm.

In terms of particle size classification, the differential mobility analyzer (DMA) has been widely used for measuring the electrical mobility and classifying particles larger than 3 nm. Its basic principle is that, under the influence of a certain electric field and flow field, charged particles are separated according to their electrical mobility (which is related to their equivalent particle size), and only particles with specific electrical mobility can be selected by the DMA. However, existing DMAs face challenges in classifying particles below 3 nm, including reduced resolution, decreased classification accuracy, and insufficient particle transmission efficiency, making it difficult to meet the requirements for precise classification of particles below 3 nm.

In terms of number concentration measurement, the condensation particle counter (CPC) is one of the most widely used instruments, which relies on the growth of particles in supersaturated vapor to optically detectable sizes. However, due to the Kelvin effect, particles below 3 nm are difficult to effectively activate to grow, resulting in a substantial reduction in measurement sensitivity and accuracy. Besides, particles below 3 nm are typically composed of only a very limited number of molecules (ranging from just a few to several tens), with extremely low concentrations in the atmosphere (generally below the ppb level), and they can readily undergo physical or chemical changes during the sampling and measurement process, further exacerbating the uncertainty of measurement.

Chinese Patent Application ZL202311442677.6 discloses a system and method for analyzing the size distribution and chemical composition of particles below 3 nm, which enables combined analysis of particle size and chemical composition. However, the system suffers from technical limitations in the design of the unipolar charger and in the coupling among its subsystems, thereby hindering the efficient transfer and analysis of 3-nanometer particles, and consequently reducing the overall response efficiency and accuracy of the analysis system for particles below 3 nm.

In summary, the existing technologies for measuring particles below 3 nm have significant limitations, particularly under low-concentration conditions, where it is difficult to simultaneously achieve efficient particle size classification and chemical composition analysis. At present, most studies remain confined to separate measurements of particle size and composition. Therefore, there is still a lack of an integrated analytical system with high sensitivity and low loss, which restricts in-depth research on nanoaerosols and the assessment of their environmental effects. Accordingly, it is urgently necessary to further optimize the system and method for analyzing the size distribution and chemical composition of particles below 3 nm, so as to enhance their sensitivity, resolution, and measurement accuracy under low-concentration conditions, thereby advancing related research and applications.

SUMMARY OF THE INVENTION

The present disclosure provides a system and method for analyzing the size distribution and chemical composition of neutral clusters below 3 nm.

In a first aspect, the present disclosure provides a system for analyzing the size distribution and chemical composition of neutral clusters below 3 nm. The system includes a sampling device, a unipolar charging device, a first coupling transport device, a nanoparticle electrical mobility size classification device, a second coupling transport device, a mass spectrometer, an aerosol number concentration measuring device, and a system control device, wherein the sampling device, the unipolar charging device, the first coupling transport device, the nanoparticle electrical mobility size classification device, the second coupling transport device, and the mass spectrometer are sequentially connected along a particle inlet direction, the second coupling transport device is connected with the aerosol number concentration measuring device, and the system control device is in signal communication with the sampling device, the unipolar charging device, the nanoparticle electrical mobility size classification device, the mass spectrometer, and the aerosol number concentration measuring device.

In a second aspect, the present disclosure provides a method for analyzing the size distribution and chemical composition of neutral clusters below 3 nm, using the system described above. The method includes the following steps:

1) setting a total flow rate and a core sampling flow rate in the sampling device, introducing the nanoparticles into the main sampling tube of the sampling device, keeping the nanoparticles in a laminar flow state in the core sampling tube, and then transporting the nanoparticles to the unipolar charging device through the core sampling flow;

2) setting a discharge gas flow rate, a first power voltage, and a second power voltage in the unipolar charging device, forming a bipolar ion stream through the excitation of discharge gas molecules in a discharge gas under the action of the first power voltage, removing ions of one polarity from the bipolar ion stream under the action of the second power voltage to obtain a unipolar ion stream, enabling the unipolar ion stream to mix and collide with nanoparticles carried by the core sampling flow to obtain charged nanoparticles, and transporting the charged nanoparticles to the first coupling transport device;

3) reducing electrostatic loss of the charged nanoparticles by the first coupling transport device, and then transporting the charged nanoparticles to the nanoparticle electrical mobility size classification device;

4) setting a sheath gas flow rate and a third power voltage in the nanoparticle electrical mobility size classification device, performing classification of the charged nanoparticles in the electrostatic classification region between the upper electrode plate and the lower electrode plate under the action of the fixed flow field and the electric field formed by the third power voltage, and transporting the nanoparticles with a desired target electrical mobility size to the second coupling transport device;

5) transporting selected nanoparticles in the second coupling transport device respectively to the mass spectrometer and the aerosol number concentration measuring device for simultaneous measurement, determining the chemical compositions of the nanoparticles under a fixed mass spectrometry sampling flow rate in the mass spectrometer, and determining the number concentration of the nanoparticles in the aerosol number concentration measuring device under a fixed aerosol sampling flow rate;

6) performing matching among the particle size, number concentration, and chemical composition information of the nanoparticles by the system control device to obtain the number concentration and chemical composition information of the nanoparticles with different particle sizes.

As described above, the present disclosure provides a system and method for analyzing the size distribution and chemical composition of neutral clusters below 3 nm. Specifically, the sampling device efficiently transports nanoparticles. The unipolar charging device generates high-concentration ions via dielectric barrier discharge to unipolarly charge the nanoparticles. The first coupling transport device reduces electrostatic loss and efficiently transports the charged particles. The nanoparticle electrical mobility size classification device classifies the charged particles by providing a fixed flow field and an electric field. Additionally, through optimizing the internal geometric configuration of the nanoparticle electrical mobility size classification device, improving the sheath gas flow rate between the electrode plates, and maintaining the laminar flow state of electrostatic classification region when the Reynolds number of the sheath gas flow exceeds 10000, the particle size resolution is enhanced and the diffusion loss of the particles is minimized. The second coupling transport device efficiently transports the selected particles to the mass spectrometer and the aerosol number concentration measuring device. The mass spectrometer determines the chemical compositions of the particles, and the aerosol number concentration measuring device determines the number concentration of the particles. The system in the present disclosure has broad application prospects in fields such as atmospheric science and materials science.

In the system and method for analyzing the size distribution and chemical composition of neutral clusters below 3 nm in the present disclosure, the structure of the unipolar charging device makes it suitable for high aerosol flow working conditions, enabling high charging efficiency of nanoparticles and significantly improving the transmission efficiency of particles within the system. In addition, the present disclosure for the first time incorporates instruments with high transmission efficiency (i.e., the first coupling transport device and the second coupling transport device) at both the inlet and the outlet of the nanoparticle electrical mobility size classification device, which further optimizes the transmission path of particles throughout the system, thereby enhancing the measurement stability and response sensitivity of the system.

Based on a core sampling method in the sampling device and combined with an efficient unipolar charging device for charging the nanoparticles, the nanoparticles are stably and efficiently guided to the inlet of the nanoparticle electrical mobility size classification device. Through an optimized electrode structure and aerodynamic design, high-resolution classification of the charged particles is achieved under the action of the electric field, and these charged particles are then efficiently transported to the particle number concentration detection module (i.e., aerosol number concentration measuring device) and the chemical composition detection module (i.e. mass spectrometer). The system and the method in the present disclosure have good adaptability and practical application prospects.

REFERENCE NUMERALS

Figure 1:
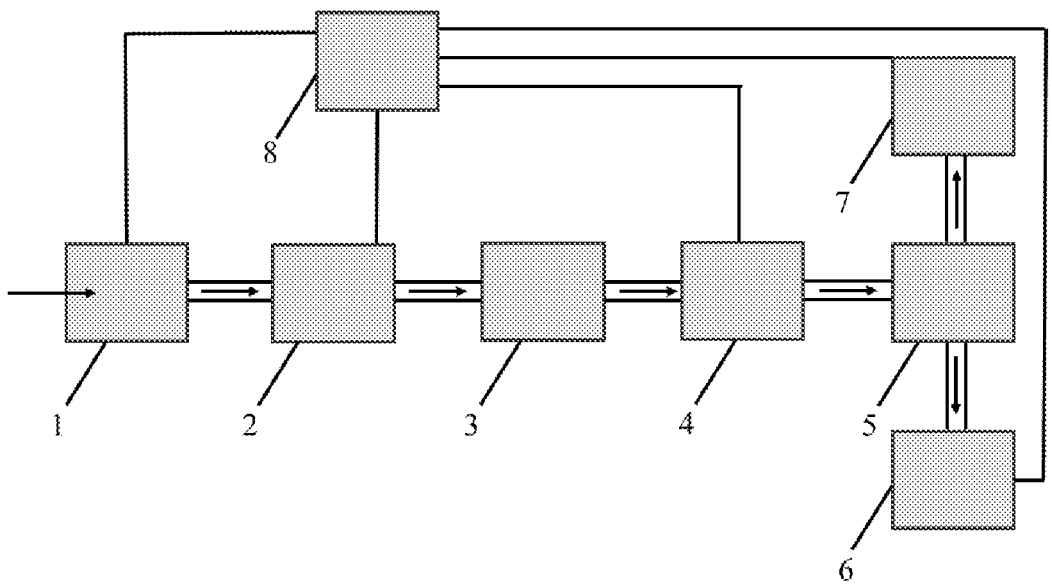
FIG. 1 is a schematic diagram showing the working principle of a system for analyzing the size distribution and chemical composition of neutral clusters below 3 nm in the present disclosure.

1 Sampling device
2 Unipolar charging device
3 First coupling transport device

4 Nanoparticle electrical mobility size classification device

5 Second coupling transport device

6 Aerosol number concentration measuring device

7 Mass spectrometer

8 System control device

201 Main sampling tube

202 Reducing tee

203 Core sampling tube

204 First particulate filter

205 Bypass blower

301 Inlet tube

302 Sealing fitting

303 Tube body

304 Dielectric barrier discharge electrode

305 Ion trapping electrode

306 Outlet tube

307 Inner tube

308 First power supply

309 Second power supply

310 Discharge gas inlet

401 First transport inlet tube

402 First transport outlet tube

403 Integrated circuit experiment board

404 Insulating connection module

405 Metal electrode

501 Aerosol inlet

502 Third power supply

503 Upper electrode plate

504 Sheath gas inlet

505 Second particulate filter

506 Temperature and humidity sensor

507 Sheath gas cooling device

508 Circulating blower

509 Aerosol outlet

510 Lower electrode plate

601 Insulating coupler

602 Stainless steel coupler

603 Ion flight chamber

604 Number concentration sampling port

DETAILED DESCRIPTION OF THE INVENTION

Refer to FIGS. 1 to 8. It should be understood that the structures, proportions, dimensions, etc., shown in the drawings attached to this specification are provided solely for the purpose of illustrating and assisting in the understanding of the disclosed content by those skilled in the art, and are not intended to limit the scope of the present disclosure. The structures, proportions, dimensions, etc., shown in the drawings do not have substantive technical significance and any modifications to the structure, changes in proportional relationships, or adjustments in dimensions that do not affect the efficacy and objectives achievable by the present disclosure should still fall within the scope of the present disclosure as disclosed. Furthermore, terms such as "upper," "lower," "left," "right," "middle," and "a/an" used herein are merely for the sake of clarity in description and are not intended to limit the scope of implementation of the present disclosure. Any changes or adjustments, provided there is no substantial change in the technical content, should also be considered within the scope of the present disclosure.

In a first aspect, the present disclosure provides a system for analyzing the size distribution and chemical composition of neutral clusters below 3 nm. As shown in FIG. 1, the system includes a sampling device, a unipolar charging device, a first coupling transport device, a nanoparticle electrical mobility size classification device, a second coupling transport device, a mass spectrometer, an aerosol number concentration measuring device, and a system control device, wherein the sampling device, the unipolar charging device, the first coupling transport device, the nanoparticle electrical mobility size classification device, the second coupling transport device, and the mass spectrometer are sequentially connected along the particle inlet direction, the second coupling transport device is connected with the aerosol number concentration measuring device, and the system control device is in signal communication with the sampling device, the unipolar charging device, the nanoparticle electrical mobility size classification device, the mass spectrometer, and the aerosol number concentration measuring device.

Figure 2:
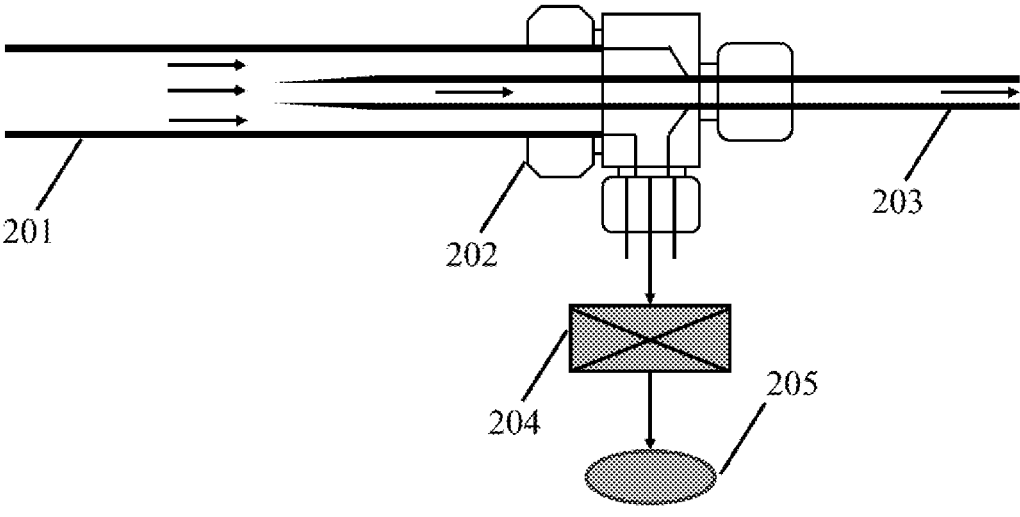
FIG. 2 is a schematic diagram of a sampling device in the present disclosure.

In the above system, as shown in FIG. 2, the sampling device includes a main sampling tube and a core sampling tube which are sequentially connected along the particle inlet direction, a reducing tee is provided between the main sampling tube and the core sampling tube. The reducing tee is also connected with a first particulate filter, and the first particulate filter is externally connected with a bypass blower.

In a specific embodiment, the ratio of the total flow rate in the main sampling tube to the core sampling flow rate in the core sampling tube is no less than 5, preferably 5-10. Through the core sampling method, the airflow in the tube is controlled to maintain a laminar flow state under the total flow rate, that is, the airflows in the main sampling tube and the core sampling tube are both in a laminar flow state. The to-be-detected particles located at the axial center of the main sampling tube are introduced into the unipolar charging device through the core sampling tube.

In a specific embodiment, the total flow rate in the main sampling tube and the core sampling flow rate in the core sampling tube are controlled to maintain a dimensionless diffusion coefficient (dimensionless diffusion loss number) of less than 0.1. Since the particles in the main sampling tube are not in contact with the tube wall, the number concentration of the nanoparticles at the centerline sampling cross-section of the entire sampling tube (including the main sampling tube and the core sampling tube) is kept close to 100%. Reducing the contact between the particles at the axial center of the tube and the tube wall is beneficial to improving the transmission efficiency of the particles, realizing highly efficient sampling of the nanoparticles.

The sampling device is an efficient sampling device designed for the high-efficiency transport of particles below 3 nm. The first particulate filter is a conventional high-efficiency particulate air (HEPA) filter, which is capable of filtering particles from the residual gas. The bypass blower is a commonly used blower, whose bypass gas flow rate is controlled by adjusting the operating voltage, and the residual gas is discharged as bypass gas through the bypass blower. The flow rate in the core sampling tube is detected and determined jointly by the mass spectrometer and the aerosol number concentration measuring device.

Figure 3:
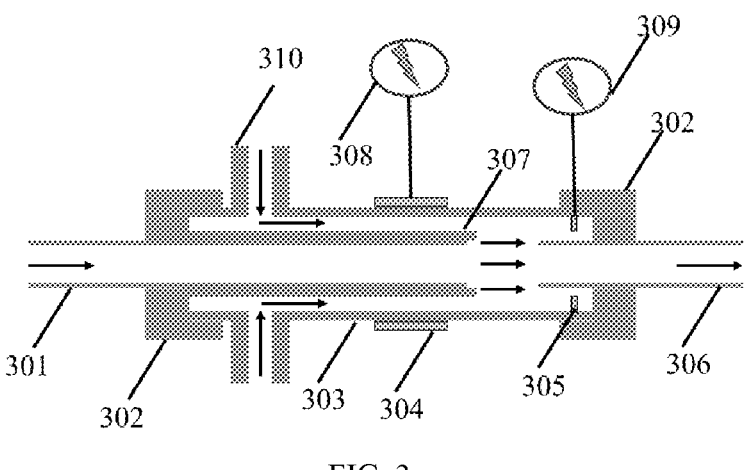
FIG. 3 is a schematic diagram of a unipolar charging device in the present disclosure.

In the above system, as shown in FIG. 3, the unipolar charging device includes a tube body, and two ends of the tube body are provided with a sealing fitting, respectively. An inlet tube is provided at an input end of the tube body as an aerosol inlet, and this inlet tube passes through the sealing fitting and then extends into the tube body. An outlet tube is provided at an output end of the tube body as an aerosol outlet, and this outlet tube passes through the sealing fitting and then extends into the tube body. The tube body is communicated with the sampling device via the inlet tube, and the tube body is communicated with the first coupling transport device via the outlet tube. An inner tube is provided in the tube body, the inner tube is sleeved over the inlet tube that extends into the tube body, and the inner tube is spaced apart from the end of the outlet tube that extends into the tube body. A discharge gas inlet and dielectric barrier discharge electrodes are sequentially arranged on an outer wall of the tube body along a particle inlet direction, the dielectric barrier discharge electrodes are annularly sleeved along a circumferential direction of the outer wall of the tube body, and the discharge gas inlet is communicated with the inside of the tube body. Ion trapping electrodes are annularly disposed along a circumferential direction of an inner wall of the tube body.

In a specific embodiment, the tube body is cylindrical in shape.

In a specific embodiment, the tube body and the inner tube are made of quartz.

In a specific embodiment, the sealing fitting is made of Teflon.

In a specific embodiment, the inlet tube and the outlet tube are made of stainless steel.

In a specific embodiment, the airflow from the inlet tube serves as the core sampling flow of the sampling device, and the flow rate of the core sampling flow is detected and measured by the mass spectrometer and the aerosol number concentration measuring device.

In a specific embodiment, the inlet tube is communicated with the core sampling tube.

In a specific embodiment, as shown in FIG. 3, the axial length of the inner tube is greater than the axial length of the inlet tube extending into the tube body.

In a specific embodiment, the axial spacing distance between the end of the inner tube adjacent to the outlet tube and the end of the outlet tube extending into the tube body is in a range of 9-11 mm, preferably 10 mm.

In a specific embodiment, the vertical distance between the end of the inner tube adjacent to the outlet tube and the dielectric barrier discharge electrodes is in a range of 9-11 mm, preferably 10 mm.

In a specific embodiment, the vertical distance between the ion trapping electrodes and the end of the outlet tube extending into the tube body is in a range of 9-11 mm, preferably 10 mm.

In a specific embodiment, an inert gas is introduced through the discharge gas inlet, and the inert gas is helium.

In a specific embodiment, as shown in FIG. 3, the dielectric barrier discharge electrodes are externally connected with a first power supply. The first power supply is an alternating current high-voltage power supply. The first power supply acts on the dielectric barrier discharge electrodes to discharge the discharge gas entering from both sides of the quartz body, thereby generating plasma. The discharge intensity can be controlled by adjusting the voltage and frequency of the first power supply.

In a specific embodiment, as shown in FIG. 3, the ion trapping electrodes are externally connected with a second power supply. The second power supply is a direct current high-voltage power supply. Under the action of the second power supply, the ion trapping electrodes perform ion trapping on the plasma generated by the discharge. The concentration of unipolar ions is adjusted by changing the ion trapping voltage. The generated unipolar ion flow mixes with the gas flow from the inlet tube, and the ions quickly collide with the particles to complete the charging.

The above unipolar charging device is a high-efficiency unipolar charging device, which can complete the charging of particles below 3 nm efficiently. It has the advantages of simple structure, low cost, stable operation, and no generation of by-products (such as ozone and particles) during use, making it suitable for particle charging under high flow conditions. The device significantly enhances the transmission efficiency of nanoparticles.

The above unipolar charging device generates plasma through dielectric barrier discharge. Under the action of the trapping voltage, the unipolar charging device generates unipolar charge ions with a very high concentration (a number concentration ranging from 107 to 10 cm$^{-3}$) and a very small particle size (for example, a particle size ranging from 0.5 nm to 1.5 nm). The charging ions collide with neutral nanoparticles from the inlet tube, bringing the nanoparticles to a charge equilibrium state, and the nanoparticle airflow after charging is then expelled from the outlet tube. The soft ionization of the unipolar ions maximizes the prevention of nanoparticle fragmentation and complex compositional changes, enhances the charging ratio of the nanoparticles.

Specifically, when the dielectric barrier discharge electrodes and the ion trapping electrodes are turned off, naturally charged particles (some of which already carry charges before charging) pass through the unipolar charging device. When the dielectric barrier discharge electrodes and the ion trapping electrodes are turned on, a very high concentration of unipolar ions is generated by dielectric barrier discharge, thereby charging the nanoparticles. By adjusting the dielectric barrier discharge frequency and the voltage of the ion trapping electrode, the number concentration of ions generated by the dielectric barrier discharge electrodes is regulated. The soft ionization of the unipolar ions maximizes the prevention of nanoparticle fragmentation and complex compositional changes, and enhances the charging ratio of the nanoparticles.

Figure 4:
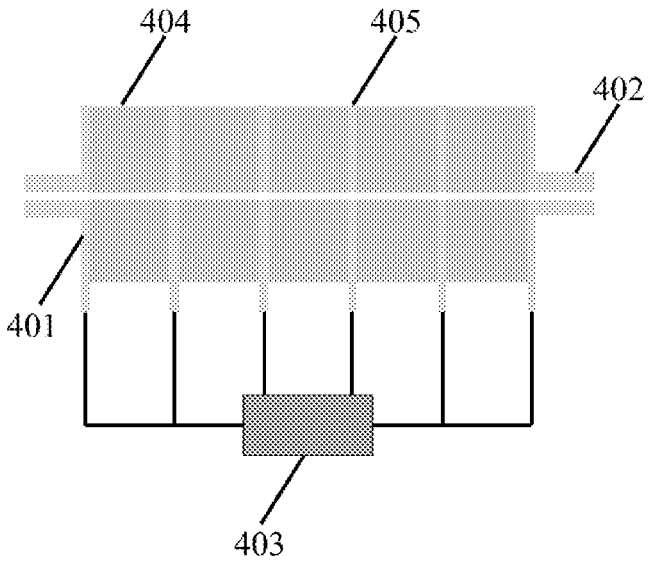
FIG. 4 is a schematic diagram of a transport structure of a first coupling transport device in the present disclosure.

In the above system, as shown in FIG. 4, the first coupling transport device includes a stacked region, which includes a first stacked section and a second stacked section. The first stacked section and the second stacked section are spaced apart to form a passage. The first stacked section and the second stacked section respectively include multiple metal electrodes, wherein any adjacent metal electrodes in the first stacked section and the second stacked section are provided with an insulating connection module therebetween, and the metal electrodes in the first stacked section and the second stacked section are externally connected with an integrated circuit experiment board. A first transport inlet tube and a first transport outlet tube are respectively arranged at two ends of the stacked region, wherein an input end of the first transport inlet tube is communicated with the outlet port of the unipolar charging device, and the output end of the first transport outlet tube is communicated with the inlet port of the nanoparticle electrical mobility size classification device.

The above stacked region adopts the structure of an ion drift tube to reduce the electrostatic loss at the inlet port due to the high-intensity electric field when the particles enter the nanoparticle electrical mobility size classification device. The ion drift tube is formed by stacked insulating connection modules (such as an electrostatic dissipative material) and metal electrodes, and a resistance of 5-10 M$\Omega$ is connected in series between adjacent metal electrodes.

In a specific embodiment, the input end of the first transport inlet tube is in communication with the outlet port of the unipolar charging device, and the output end of the first transport outlet tube is in communication with the aerosol inlet of the nanoparticle electrical mobility size classification device.

In a specific embodiment, the first transport inlet tube and the first transport outlet tube are made of stainless steel.

In a specific embodiment, the metal electrodes and the insulating connection modules are sealed with O-rings to achieve good electrical insulation and hermeticity.

In a specific embodiment, the metal electrodes are commonly used metal electrodes, such as stainless-steel electrodes.

In a specific embodiment, the insulating connection modules are made of an electrostatic dissipative material. The electrostatic dissipative material is prepared by adding a special antistatic agent to a polyoxymethylene-based material, which can effectively enhance its electrostatic dissipation performance and prevent electrostatic accumulation, thereby improving the transmission efficiency of charged particles in a reverse electric field.

In a specific embodiment, the stacked region is fastened with four threaded rods made of insulating materials in cooperation with nuts, so as to ensure the overall sealing performance of the device.

In a specific embodiment, the threaded rods are made of a high-temperature-resistant and corrosion-resistant polyether ether ketone (PEEK), and both ends of the threaded rods are provided with external threads to facilitate their detachable connection with the corresponding connecting member.

In a specific embodiment, the integrated circuit experiment board includes several resistors connected in serial, wherein the number of resistors is the same as that of the metal electrodes, and each of the resistors is connected with a corresponding metal electrode. One end of the integrated circuit experiment board is connected with the nanoparticle electrical mobility size classification device, and the other end of the integrated circuit experiment board is connected with the unipolar charging device and grounded. Therefore, a stable and uniform reverse electric field is established inside the first coupling transport device, which effectively reduces the electrostatic loss of the charged particles when entering the nanoparticle electrical mobility size classification device, and improves the overall particle transmission efficiency.

In a specific embodiment, the resistor's resistance is in a range of 5-10 MΩ.

In a specific embodiment, one end of the integrated circuit experiment board is electrically connected with the upper electrode plate of the nanoparticle electrical mobility size classification device, and the other end of the integrated circuit experiment board is grounded.

The first coupling transport device is a coupling transport device between the unipolar charging device and the nanoparticle electrical mobility size classification device, and is used for connecting the outlet port of the unipolar charging device and the inlet port of the nanoparticle electrical mobility size classification device. The first coupling transport device solves the problem in the existing nanoparticle electrical mobility size classification devices, wherein the application of a high voltage to the upper electrode plate results in a non-uniform reverse electric field at the aerosol inlet, thereby causing significant electrostatic losses of charged particles during transmission. By constructing a proper and uniform reverse electric field, the interference caused by the local high-intensity electric field at the inlet port of the nanoparticle particle size classification device on the charged particles is effectively inhibited, achieving highly efficient transmission of the charged particles.

Figure 5:
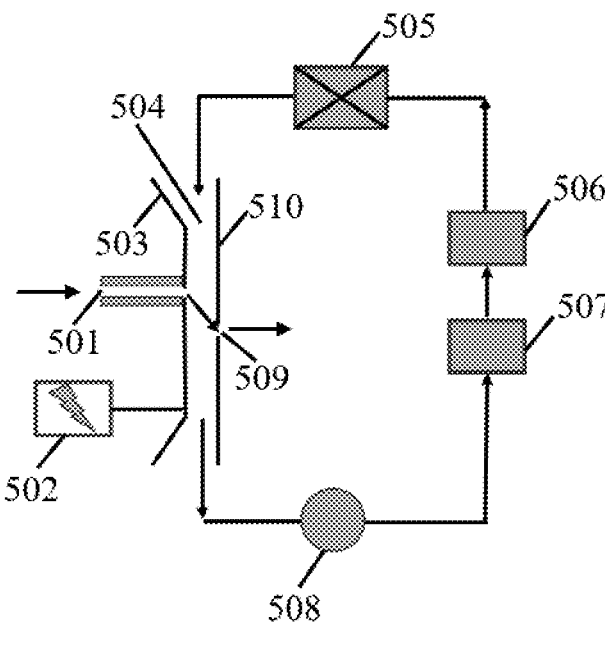
FIG. 5 is a schematic diagram showing a nanoparticle electrical mobility size classification device and its working process in the present disclosure.

In the above system, as shown in FIG. 5, the nanoparticle electrical mobility size classification device includes a fixed electric field and a fixed flow field, wherein the fixed electric field is provided through an upper electrode plate and a lower electrode plate sequentially arranged along the particle inlet direction. The upper electrode plate is parallel to the lower electrode plate, and the upper electrode plate and the lower electrode are spaced apart to form a sheath gas channel which acts as an electrostatic classification region. The upper electrode plate and the lower electrode plate are respectively provided with a slit, the slit of the upper electrode plate is externally communicated with the aerosol inlet, the slit of the lower electrode plate serves as an aerosol outlet, and the upper electrode plate is externally connected with a third power supply. The fixed flow field includes a sheath gas flow closed loop through the sheath gas channel. The inlet of the sheath gas channel is provided with a sheath gas inlet. Along the sheath gas flow closed loop, positioned outside the sheath gas channel and away from the sheath gas inlet, a second particle filter, a temperature and humidity sensor, a sheath gas cooling device and a circulating blower are sequentially arranged.

In a specific embodiment, the aerosol inlet is communicated with the first coupling transport device, and the aerosol outlet is communicated with the second coupling transport device.

In a specific embodiment, the aerosol inlet is in communication with the first transport outlet tube.

In a specific embodiment, a thickness of the upper electrode plate and the lower electrode plate is in a range of 0.1-1 cm, preferably 0.5 cm.

In a specific embodiment, the length of the upper electrode plate and the lower electrode plate that form the sheath gas channel is in a range of 20-30 cm, preferably 24 cm; the width of the upper electrode plate and the lower electrode plate that form the sheath gas channel is in a range of 3-5 cm, preferably 4 cm.

In a specific embodiment, the horizontal distance between the slit of the upper electrode plate and the slit of the lower electrode plate is in a range of 3-5 cm, preferably 4 cm.

In a specific embodiment, the width of the slit of the upper electrode plate for allowing aerosol to enter is in a range of 0.5-0.7 mm, preferably 0.6 mm; the width of the slit of the lower electrode plate for allowing aerosol to exit is in a range of 0.1-0.2 mm, preferably 0.15 mm.

The diffusion loss of particles during the particle size classification process can be reduced by decreasing the length and spacing between the upper electrode plate and the lower electrode plate.

In a specific embodiment, the fixed voltage ranging from −10 kV to 10 kV is applied between the upper electrode plate and the lower electrode plate, thereby forming a uniform electric field between the upper electrode plate and the lower electrode plate to achieve classification of particles with different electrical mobility sizes.

The slit of the upper electrode plate is the inlet for the to-be-tested particles, and the slit of the lower electrode plate is the outlet for the particles after size classification. When the charged particles flow into the electrostatic classification region, due to particles with different particle sizes having different electric mobilities under a certain electric field condition, they follow different motion paths, and only the nanoparticles with a specific electric mobility can be classified and exit through the outlet, thereby achieving size classification of nanoparticles through this structure. Specifically, the to-be-tested aerosol particles flow in from the slit of the upper electrode plate and flow out from the slit at the lower part of the lower electrode plate. The slit that allows the to-be-tested particles to enter the classification electric field is designed based on fluid dynamics to reduce the radial flow velocity of the gas flow between the upper and lower electrode plates, which greatly enhances the particle size resolution of the classification. The flow field conditions between the upper electrode plate and the lower electrode plate play a crucial role in the efficient and accurate classification of nanoparticles. The nanoparticle electrical mobility size classification device in the present disclosure minimizes the impact of turbulence on the nanoparticle classification process by improving the machining precision of the electrode plate surfaces, shortening the length of the electrode plates, and incorporating a converging inlet design for the sheath gas flow.

In a specific embodiment, the flow rate of sheath gas between the upper electrode plate and the lower electrode plate is in a range of 300-1500 L/min.

In a specific embodiment, the inlet of the sheath gas channel which enables the sheath gas to enter the electrostatic classification region between the upper electrode plate and the lower electrode plate is a converging frustum, and the angle between the wall of the inlet of the sheath gas channel and the central axis of the sheath gas channel is in a range of 25-35°, preferably 30°. The outlet of the sheath gas channel which enables the sheath gas to exit the electrostatic classification region between the upper electrode plate and the lower electrode plate is a diverging frustum, and the angle between the wall of the outlet of the sheath gas channel and the central axis of the sheath gas channel is in a range of 25-35°, preferably 30°.

In a specific embodiment, the inner walls of the upper electrode plate and the lower electrode plate that form the sheath gas channel are subjected to mirror polishing, and the machining precision is below or equal to 0.02 mm.

By optimizing the internal geometrical configuration and machining precision, the sheath gas flow with the Reynolds number greater than 10000 in the particle size electrostatic classification region between the two electrode plates can be maintained at a laminar flow state.

The nanoparticle particle size classification device is an instrument used for constructing a stable flow field and electric field to form a fixed flow field and electric field, and particle size classification is carried out according to the electric mobility of charged particles to obtain a monodisperse standard aerosol.

The circulating blower is a conventional brushless blower and is configured to control the flow rate of the sheath air in the classification process. The sheath gas cooling device is a universal aluminum air-to-water intercooler and is provided with a low-temperature thermostatic bath for controlling the temperature of the sheath gas. The temperature and humidity sensor is a conventional temperature and humidity sensor, and can effectively monitor the temperature and humidity of the sheath gas. The second particulate filter is a conventional high-efficiency particulate air (HEPA) filter, which can filter particles in the sheath gas.

The third power supply is a high-voltage direct-current power supply, which provides a classification voltage to the upper electrode plate, the potential of which can be switched between positive and negative. The lower electrode plate is grounded. Since the upper electrode plate carries high voltage, failure to provide isolation would seriously compromise operational safety. In the embodiment, a design for isolating the electrode plate is provided, with the material being polyether ether ketone (PEEK), so that the electrode plate is electrically insulated from both the system chamber wall and the detection devices. In this way, the high voltage on the electrode plate will not be conducted to the system chamber wall or the detection devices, thereby ensuring the safety of using the detection system.

The operating mode of the nanoparticle electrical mobility size classification device needs to be consistent with that of the unipolar charging device. When the unipolar charging device charges nanoparticles with positive ions, the nanoparticle electrical mobility size classification device should correspondingly switch to the operating mode for classifying positively charged particles.

Figure 6:
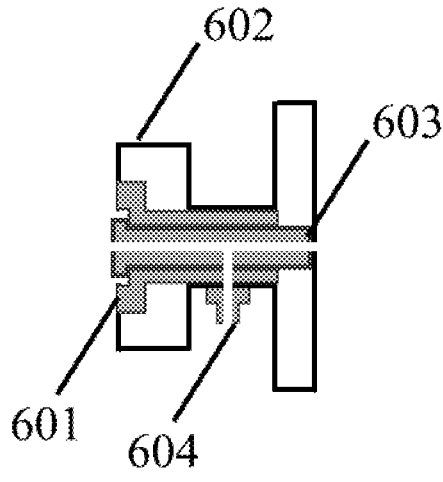
FIG. 6 is a schematic diagram of a transport structure of a second coupling transport device in the present disclosure.

In the above system, as shown in FIG. 6, the second coupling transport device includes an ion flight chamber, an insulating coupler, and a stainless-steel coupler sequentially arranged from inside to outside. The ion flight chamber and the insulating coupler are fastened to the lower electrode plate of the nanoparticle electrical mobility size classification device, and the inlet of the ion flight chamber is coaxial with the outlet of the nanoparticle electrical mobility size classification device. The stainless-steel coupler is connected with the inlet end of the mass spectrometer. The outlet of the ion flight chamber is coaxial with the inlet of the mass spectrometer, and the ion flight chamber is further provided with a number concentration sampling port which is communicated with the aerosol number concentration measuring device.

In a specific embodiment, the ion flight chamber is fastened to the lower electrode plate of the nanoparticle electrical mobility size classification device through screws.

In a specific embodiment, the insulating coupler is made of polyether ether ketone (PEEK).

In a specific embodiment, the insulating coupler is a hollow structured flat plate, which is used to form an electrical insulation structure between the lower electrode plate of the nanoparticle electrical mobility size classification device and the stainless-steel coupler.

In a specific embodiment, the stainless-steel coupler is made of stainless steel.

In a specific embodiment, the stainless-steel coupler is a hollow structured stainless-steel plate. The stainless-steel coupler ensures that the stainless-steel coupler and the mass spectrometer have the same potential, so that interference on particle transmission caused by potential difference can be avoided.

In a specific embodiment, the inlet of the ion flight chamber is coaxial with the aerosol outlet of the nanoparticle electrical mobility size classification device. The inlet of the ion flight chamber is communicated with the aerosol outlet of the nanoparticle electrical mobility size classification device with the same inner diameter. This design effectively reduces particle loss caused by changes in tube diameter or disturbances in the flow field.

In a specific embodiment, the inner diameter of the ion flight chamber is in a range of 0.5-2 mm, preferably 1 mm; and the machining precision of the ion flight chamber is less than or equal to 0.05 mm.

In a specific embodiment, the distance between the outlet of the ion flight chamber and the inlet of the mass spectrometer is in a range of 0.5-1.0 cm, preferably 1 cm.

In a specific embodiment, the number concentration sampling port is located at a radial position of the ion flight chamber.

In a specific embodiment, the outlet of the ion flight chamber is electrically connected to the flow-limiting sampling orifice of the mass spectrometer. The electric potential at the outlet of the ion flight chamber is the same as that of the inlet of the mass spectrometer.

In a specific embodiment, the components of the second coupling transport device are sealed by O-rings to ensure the overall hermeticity.

The second coupling transport device is a coupling transport device between the nanoparticle electrical mobility size classification device and the mass spectrometer, used to connect the outlet port of the nanoparticle electrical mobility size classification device with the aerosol number concentration measuring device and the mass spectrometer. It aims to solve the problem of significant particle transmission loss caused by mismatch in tube dimensions between the outlet of the nanoparticle electrical mobility size classification device and the chemical composition detector in conventional systems. The particle transmission loss is mainly overcome by maintaining the inner diameter of the ion flight chamber in the second coupling transport device consistent with that of the outlet of the nanoparticle electrical mobility size classification device, thus keeping the same transmission tube dimensions, reducing dead volume, and shortening the time for particle transmission to the detectors, thereby improving the particle transmission efficiency to the aerosol number concentration measuring device and the mass spectrometer.

In the above system, as shown in FIG. 1, the mass spectrometer is a conventional mass spectrometer with a detector, specifically an atmospheric-pressure-interface time-of-flight mass spectrometer. The chemical components of the charged nanoparticles can be directly measured, and matched with the particle size and number concentration information of the nanoparticles provided by the aerosol number concentration measuring device.

In a specific embodiment, in the number concentration detection, charged particles are filtered through a quartz filter within the Faraday cup, generating a weak current during transport between the filter and the wire. This current is measured using an electrometer, and, in combination with the aerosol flow rate, the concentration of the charged particles is calculated. The concentration (C) of the charged particle is given by:

$$C = \frac{I}{n * e * Q * \eta}$$

wherein I is the weak current measured by the electrometer, n is the number of charges carried by the particle, e is the elementary charge, Q is the sampling flow rate of the aerosol electrometer, and η is the detection efficiency of the aerosol electrometer.

In the above system, as shown in FIG. 1, the aerosol number concentration measuring device is a conventionally used device, such as an aerosol electrometer. The aerosol number concentration measuring device measures the concentration of the charged particles, focusing primarily on the detection of charged particles. The concentration is calculated by measuring the weak current generated by the particles. Its notable advantage is that it is not subject to the limitation of the Kelvin effect, and therefore, there is theoretically no lower limit for particle size detection.

In the above system, as shown in FIG. 1, the system control device includes a first data acquisition card, a second data acquisition card, and a controller module, wherein the first data acquisition card is configured to collect chemical composition information data measured by the mass spectrometer, the second data acquisition card is configured to collect particle size information and number concentration data of the nanoparticles measured by the aerosol number concentration measuring device, and the controller module obtains number concentration and the chemical composition information of the nanoparticles with different particle sizes through a time matching technology.

In a specific embodiment, the second data acquisition card further collects data from other devices connected via signal communication, in addition to the particle size information obtained from the nanoparticle electrical mobility size classification device, and controls the operation of other devices connected via signal communication, except for the mass spectrometer.

The first data acquisition card controls the operating conditions of the mass spectrometer.

The second data acquisition card reads and controls sensor signals of the temperature, pressure, flow rate, and voltage of the entire system in real time. It can also read the current signal output by the aerosol measurement device, and convert the current into the particle concentration on the basis of the present flow rate condition. The instrument parameters that can be controlled by the second data acquisition card include: the bypass flow rate and core sampling flow rate of the sampling device; the sampling flow rate and discharge gas flow rate of the unipolar charging device, as well as the dielectric barrier discharge voltage intensity and frequency, and the ion trapping electrode voltage intensity; the sheath gas flow rate, cooling temperature, and classification voltage of the nanoparticle electrical mobility size classification device; and the sample flow rate of the aerosol number concentration measuring device, etc.

The time matching technology refers to: since the cluster size and chemical composition detectors have different response times to the instantaneous variation of clusters, standard clusters are used to calibrate and correct the response times under different conditions, thereby achieving accurate correspondence among the measurement results of nanoparticle size, number concentration, and chemical composition. The time-matching technology, together with calibration experiments using standard clusters, can be employed to correct the time lag.

The above system control device is a system control module capable of controlling the operation of each device connected thereto via signal communication. It coordinates the operation of the sampling device, the unipolar charging device, the nanoparticle electrical mobility size classification device, the mass spectrometer, and the aerosol number concentration measuring device, while also performing data acquisition and visualization. The input and output signals of all hardware within the system are calibrated and processed in real-time, enabling automatic control of the system and matching of data across multiple devices. It also performs preliminarily processing and displays the particle size distribution, number concentration, and chemical composition data collected.

The first data acquisition card, the second data acquisition card, and the controller module are all conventional controllers. It is well understood by those skilled in the art that the processes of calculation, comparison, determination, and output of instructions by the controller module can be implemented by integrated circuit modules, programmable logic devices, other hardware, or by installing corresponding software modules in the existing technology.

After size classification, the system obtains nanoparticles of a single particle size, which are then transported to the second coupling transport device. The number concentration of the particles is measured by the aerosol number concentration measuring device, while the chemical composition is measured by the mass spectrometer. In order to achieve accurate correspondence among particle size, concentration, and chemical composition, the response times corresponding to changes in the concentration and chemical composition of nanoparticles under different conditions need to be calibrated and corrected.

In a second aspect, the present disclosure provides a method for analyzing the size distribution and chemical composition of neutral clusters below 3 nm, using the above system for analyzing the size distribution and chemical composition of neutral clusters below 3 nm, including the following steps:

1) setting a total flow rate and a core sampling flow rate in the sampling device, introducing the nanoparticles into the main sampling tube of the sampling device, keeping the nanoparticles in a laminar flow state in the core sampling tube, and then transporting the nanoparticles to the unipolar charging device through the core sampling flow;

2) setting a discharge gas flow rate, a first power voltage, and a second power voltage in the unipolar charging device, forming a unipolar ion stream using the plasma generated by the discharge gas under the action of the first power voltage, enabling the ion stream to mix and collide with nanoparticles carried by the core sampling flow under the action of the second power voltage to obtain charged nanoparticles, and transporting the charged nanoparticles to the first coupling transport device;

3) reducing the electrostatic loss of the charged nanoparticles by the first coupling transport device, and then transporting the charged nanoparticles to the nanoparticle electrical mobility size classification device;

4) setting a sheath gas flow rate and a third power voltage in the nanoparticle electrical mobility size classification device, performing classification of the charged nanoparticles in the electrostatic classification region between the upper electrode plate and the lower electrode plate under the action of the fixed flow field and the electric field formed by the third power voltage, and transporting the nanoparticles with a desired target electrical mobility size to the second coupling transport device;

5) transporting selected nanoparticles in the second coupling transport device respectively to the mass spectrometer and the aerosol number concentration measuring device for simultaneous measurement, determining the chemical compositions of the nanoparticles under a fixed mass spectrometry sampling flow rate in the mass spectrometer, and determining the number concentration of the nanoparticles in the aerosol number concentration measuring device under a fixed aerosol sampling flow rate;

6) performing matching among the particle size, number concentration, and chemical composition information of the nanoparticles by the system control device to obtain the number concentration and chemical composition information of the nanoparticles with different particle sizes.

In the above step 1), the ratio of the total flow rate to the core sampling flow rate is no less than 5, preferably in a range of 5-10.

In the above step 1), the total flow rate and the core sampling flow rate are controlled to maintain a dimensionless diffusion coefficient (dimensionless diffusion loss number) of less than 0.1.

In the above step 1), the core sampling flow rate is in a range of 5-10 L/min, preferably 8 L/min.

In the above step 2), the discharge gas flow rate is in a range of 0.5-1.0 L/min, preferably 1 L/min.

In the above step 2), the first power voltage is in a range of 2.0-3.5 KV.

In the above step 2), the second power voltage is in a range of 1000-1300V, preferably 1200V.

In the above step 2), the frequency of the unipolar charging device is in a range of 9-13 kHz, preferably 10 kHz.

In the above step 2), when the charged nanoparticles are transported to the first coupling transport device, the bypass flow rate at the outlet of the unipolar charging device is in a range of 3-5 L/min, preferably 5 L/min.

In the above step 3), in the first coupling transport device, the flow rate of the input charged nanoparticles is in a range of 3.0-5.0 L/min, preferably 3.0 L/min.

In the above step 3), the inner diameter of the passage of the first coupling transport device is in a range of 3-5 mm, preferably 3 mm; and the length of the passage of the first coupling transport device is in a range of 11-13 cm, preferably 12 cm.

In the above step 4), the sheath gas flow rate is in a range of 300-1500 L/min, preferably 1200 L/min.

In the above step 4), the third power voltage is in a range of $-10$ k-10 kV.

In the above step 4), a particle size resolution of 1.47-nm particles is greater than 80, preferably greater than 100.

In the above step 5), the mass spectrometry sampling flow rate is 0.8 L/min.

In the above step 5), the aerosol sampling flow rate is in a range of 1-2.2 L/min.

The implementation of the present disclosure is described below through specific embodiments, and those skilled in the art can easily understand other advantages and effects of the present disclosure from the content disclosed in this specification.

Embodiment 1

In this embodiment, the system for analyzing the size distribution and chemical composition of neutral clusters below 3 nm is employed. The ratio of the total flow rate to the core sampling flow rate was 5 in the sampling device, and the core sampling flow rate was controlled to be 8 L/min by the back-end instruments and the bypass flow. The nanoparticles were introduced into the main sampling tube of the sampling device and maintained in a laminar flow state in the core sampling tube for sampling, and then the sampled nanoparticles were transported to the unipolar charging device through the core sampling flow.

In the unipolar charging device, the flow rate of the discharge gas was 1 L/min, the voltage of the first power supply was 2 KV, the frequency was 10 kHz, and the voltage of the second power supply was $-1200$V. The bipolar ion stream was first formed through the excitation of discharge gas molecules in the discharge gas under the action of the first power supply, and then ions of one polarity were removed from the bipolar ion stream to obtain the unipolar ion stream under the action of the second power supply, afterwards, the unipolar ion stream was mixed and collided with the nanoparticles carried by the core sampling flow to obtain charged nanoparticles. The bypass gas flow rate at the outlet of the unipolar charging device was 5 L/min, and the charged nanoparticles were transported to the first coupling transport device with a flow rate of 3.0 L/min.

The electrostatic loss of the charged nanoparticles was reduced by the first coupling transport device, and then the charged nanoparticles were transported to the nanoparticle electrical mobility size classification device. The inner diameter and length of the first coupling transport device were 3 mm and 12 cm, respectively.

In the nanoparticle electrical mobility size classification device, the flow rate of the sheath gas was 1200 L/min, and the voltage of the third power supply was in a range of 0-10 kV. Under the action of the fixed flow field and the electric field formed by the third power voltage, the charged nanoparticles were classified along the electrostatic classification region between the upper electrode plate and the lower electrode plate. The particle size resolution of 1.47-nm nanoparticles was greater than 100, and the nanoparticles with the desired target electrical mobility size were transported to the second coupling transport device.

After passing through the second coupling transport device, the selected nanoparticles were separately transported to the atmospheric-pressure interface time-of-flight mass spectrometer and the aerosol electrometer for simultaneous measurement. The sampling flow rate was 0.8 L/min in the atmospheric-pressure interface time-of-flight mass spectrometer to introduce the nanoparticles for chemical composition analysis. The sampling flow rate was 2.2 L/min in the aerosol electrometer to introduce the nanoparticles for measuring particle number concentration.

The particle size, number concentration, and chemical composition information of the nanoparticles were correspondingly matched using the system control device to obtain the number concentration and chemical composition information of the nanoparticles with different particle sizes.

Embodiment 2

In this embodiment, the system for analyzing the size distribution and chemical composition of neutral clusters below 3 nm is employed. The ratio of the total flow rate to the core sampling flow rate was 6 in the sampling device, and the core sampling flow rate was controlled to be 9 L/min by the back-end instruments and the bypass flow. The nanoparticles were introduced into the main sampling tube of the sampling device and maintained in a laminar flow state in the core sampling tube for sampling, and then the sampled nanoparticles were transported to the unipolar charging device through the core sampling flow.

In the unipolar charging device, the flow rate of the discharge gas was 1 L/min, the voltage of the first power supply was 3 KV, the frequency was 12 kHz, and the voltage of the second power supply was 1100V. The bipolar ion stream was first formed through the excitation of discharge gas molecules in the discharge gas under the action of the first power supply, and then ions of one polarity were removed from the bipolar ion stream to obtain the unipolar ion stream under the action of the second power supply, afterwards, the unipolar ion stream was mixed and collided with the nanoparticles carried by the core sampling flow to obtain charged nanoparticles. The bypass gas flow rate at the outlet of the unipolar charging device was 4 L/min, and the charged nanoparticles were transported to the first coupling transport device with a flow rate of 4.0 L/min.

The electrostatic loss of the charged nanoparticles was reduced by the first coupling transport device, and then the charged nanoparticles were transported to the nanoparticle electrical mobility size classification device. The passage of the first coupling transport device had an inner diameter of 4 mm and a length of 11 cm.

In the nanoparticle electrical mobility size classification device, the flow rate of the sheath gas was 1000 L/min, and the voltage of the third power supply was in a range of −10-10 kV. Under the action of the fixed flow field and the electric field formed by the third power voltage, the charged nanoparticles were classified along the electrostatic classification region between the upper electrode plate and the lower electrode plate. The particle size resolution of 1.47-nm nanoparticles was greater than 90, and the nanoparticles with the desired target electrical mobility size were transported to the second coupling transport device.

After passing through the second coupling transport device, the selected nanoparticles were respectively transported to the atmospheric-pressure interface time-of-flight mass spectrometer and the aerosol electrometer for simultaneous measurement. The sampling flow rate was 0.8 L/min in the atmospheric-pressure interface time-of-flight mass spectrometer to introduce the nanoparticles for chemical composition analysis. The sampling flow rate was 2 L/min in the aerosol electrometer to introduce the nanoparticles for measuring particle number concentration.

The particle size, number concentration, and chemical composition information of the nanoparticles were correspondingly matched using the system control device to obtain the number concentration and chemical composition information of the nanoparticles with different particle sizes.

Test Example 1

Figure 7A:
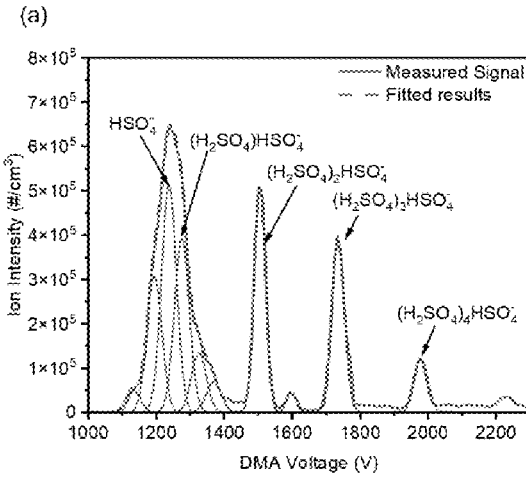
FIG. 7*a* is a schematic diagram showing the results of particle size distribution in the present disclosure.
Figure 7B:
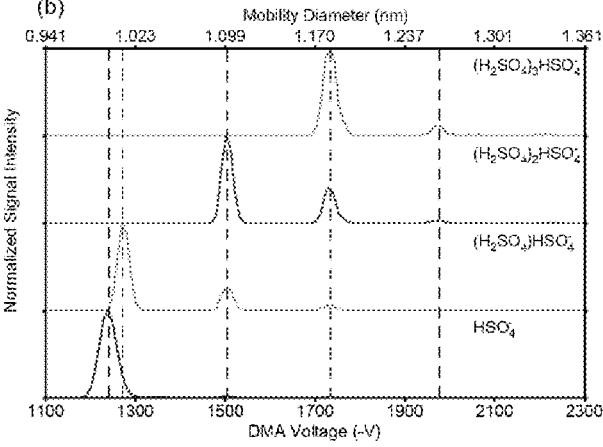
FIG. 7*b* is a schematic diagram showing mass spectrometry results under different electrical mobilities in the present disclosure.
Figure 8:
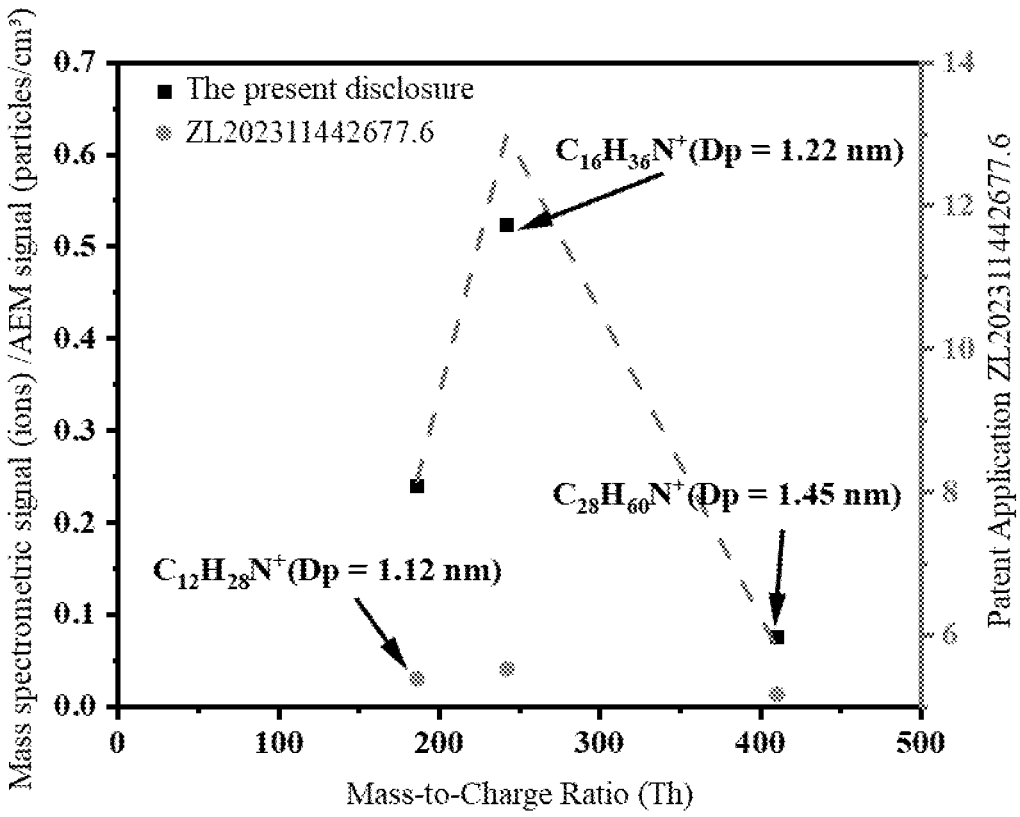
FIG. 8 shows a comparison diagram of the signal responses of the present disclosure and Chinese Patent Application ZL202311442677.6 for particles with different sizes.

In Test Example 1, nanoparticles generated by electrospraying were analyzed using the method described in Embodiment 1. Particle size distribution and chemical composition data of the electrosprayed nanoparticles were obtained from the aerosol electrometer and the atmospheric-pressure interface time-of-flight mass spectrometer under different particle size classification conditions. The results were shown in FIGS. 7 *a* and 7*b*. By applying electrospray ionization to a sulfuric acid solution, sulfuric acid clusters were generated, from which both their electrical mobility diameters and mass-to-charge ratios were determined. FIG. 7*a* showed the particle size distribution results, while FIG. 7*b* showed the mass spectrometry results under different electrical mobilities. These results illustrated that the system can effectively classify and measure nanoclusters of different particle sizes generated by electrospraying.

Test Example 2

In Test Example 2, nanoparticles generated by electrospraying were measured using the analysis method of Embodiment 1 and the method disclosed in Chinese Patent Application ZL202311442677.6, respectively. Under the same electrospraying operation conditions, by adjusting the size classification voltage, combining particle number concentration data obtained from the aerosol electrometer with the chemical composition information from the atmospheric-pressure interface time-of-flight mass spectrometer, the responses of the two methods to particles of different sizes were compared. The results were shown in FIG. 8. The measurement results demonstrated that, for particles with different particle sizes, the analysis system of the present disclosure yielded a higher signal response, reflecting its higher transmission efficiency and detection sensitivity. Therefore, the system and analysis method provided by the present disclosure are applicable to a broader range of nanoparticle analysis, such as environmental monitoring, atmospheric scientific research, nanomaterial characterization, bioaerosol analysis, and monitoring of ultrafine particles in industrial processes.

In summary, the present disclosure provides a system and method for analyzing particle size distribution and chemical composition of neutral clusters below 3 nm. Based on the core sampling method, the system achieves efficient sampling of nanoparticles. The unipolar charging device, with its high charging efficiency, charges the nanoparticles and efficiently transports them to the inlet of the nanoparticle electrical mobility size classification device. Through a special aerodynamic design, the nanoparticles pass through the electric field between electrode plates and are efficiently transmitted to the particle number concentration detector and the chemical composition detector. The system demonstrates excellent application prospects. Therefore, the present disclosure effectively overcomes the shortcomings of the prior art and holds significant industrial utilization value.

The above embodiments are merely illustrative of the principles and effects of the present disclosure, and are not intended to limit the present disclosure. Anyone skilled in the art may modify or alter the above embodiments without departing from the spirit and scope of the present disclosure. Accordingly, any modifications or variations made within the disclosed principles and technical concepts of the present disclosure, as understood by a person of ordinary skill in the art, shall still be within the scope of the claims of the present disclosure.

The invention claimed is:

1. A system for analyzing the size distribution and chemical composition of neutral clusters below 3 nm, comprising a sampling device, a unipolar charging device, a first coupling transport device, a nanoparticle electrical mobility size classification device, a second coupling transport device, a mass spectrometer, an aerosol number concentration measuring device, and a system control device, wherein the sampling device, the unipolar charging device, the first coupling transport device, the nanoparticle electrical mobility size classification device, the second coupling transport device, and the mass spectrometer are sequentially connected along a particle inlet direction, the second coupling transport device is connected with the aerosol number concentration measuring device, and the system control device is in signal communication with the sampling device, the unipolar charging device, the nanoparticle electrical mobility size classification device, the mass spectrometer, and the aerosol number concentration measuring device, wherein the first coupling transport device is configured to establish a stable and uniform reverse electric field so as to suppress interference caused by a local high-intensity electric field at an inlet of the nanoparticle electrical mobility size classification device on charged particles; and wherein the second coupling transport device is configured to provide a particle transfer passage having an inner diameter the same as that of an outlet of the nanoparticle electrical mobility size classification device, so as to reduce particle loss caused by a mismatch in tube dimensions and/or flow field disturbances.

2. The system according to claim 1, wherein the sampling device comprises a main sampling tube and a core sampling tube which are sequentially connected along the particle inlet direction, a reducing tee is provided between the main sampling tube and the core sampling tube, the reducing tee is also connected with a first particulate filter, and the first particulate filter is externally connected with a bypass blower.

3. The system according to claim 1, wherein the unipolar charging device comprises a tube body, and two ends of the tube body are provided with a sealing fitting, respectively;

an inlet tube is provided at an input end of the tube body as a particle inlet, and the inlet tube passes through the sealing fitting and then extends into the tube body;

an outlet tube is provided at an output end of the tube body as a particle outlet, and the outlet tube passes through the sealing fitting and then extends into the tube body;

the tube body is communicated with the sampling device through the inlet tube, and the tube body is communicated with the first coupling transport device through the outlet tube;

an inner tube is provided in the tube body, the inner tube is sleeved over the inlet tube that extends into the tube body, and the inner tube is spaced apart from the end of the outlet tube that extends into the tube body;

a discharge gas inlet and dielectric barrier discharge electrodes are sequentially arranged on an outer wall of the tube body along the particle inlet direction, the dielectric barrier discharge electrodes are annularly sleeved along a circumferential direction of the outer wall of the tube body, and the discharge gas inlet is communicated with the inside of the tube body; and ion trapping electrodes are annularly disposed along a circumferential direction of an inner wall of the tube body.

4. The system according to claim 1, wherein the first coupling transport device comprises a stacked region, the stacked region comprises a first stacked section and a second stacked section, and the first stacked section and the second stacked section are spaced apart to form a passage;

the first stacked section and the second stacked section comprise multiple metal electrodes, wherein any two adjacent metal electrodes in the first stacked section and the second stacked section are provided with an insulating connection module therebetween, and the metal electrodes in the first stacked section and the second stacked section are externally connected with an integrated circuit experiment board;

a first transport inlet tube and a first transport outlet tube are respectively arranged at two ends of the stacked region, wherein an input end of the first transport inlet tube is communicated with an outlet port of the unipolar charging device, and an output end of the first transport outlet tube is communicated with an inlet port of the nanoparticle electrical mobility size classification device.

5. The system according to claim 1, wherein the nanoparticle electrical mobility size classification device comprises a fixed electric field and a fixed flow field, the fixed electric field is provided through an upper electrode plate and a lower electrode plate sequentially arranged along the particle inlet direction, the upper electrode plate is parallel to the lower electrode plate, and the upper electrode plate and the lower electrode plate are spaced apart to form a sheath gas channel which acts as an electrostatic classification region;

the upper electrode plate and the lower electrode plate are respectively provided with a slit, the slit of the upper electrode plate is externally communicated with an aerosol inlet, the slit of the lower electrode plate serves as an aerosol outlet, and the upper electrode plate is externally connected with a third power supply;

the fixed flow field comprises a sheath gas flow closed loop containing the sheath gas channel, an inlet of the sheath gas channel is provided with a sheath gas inlet, and along the sheath gas flow closed loop excluding the sheath gas channel, and in a direction away from the sheath gas inlet, a second particle filter, a temperature and humidity sensor, a sheath gas cooling device and a circulating blower are sequentially arranged.

6. The system according to claim 1, wherein the second coupling transport device comprises an ion flight chamber, an insulating coupler, and a stainless-steel coupler sequentially arranged from inside to outside;

the ion flight chamber and the insulating coupler are fastened to a lower electrode plate of the nanoparticle electrical mobility size classification device, and an inlet port of the ion flight chamber is coaxial with an outlet port of the nanoparticle electrical mobility size classification device;

the stainless-steel coupler is connected with an inlet port of the mass spectrometer;

an outlet port of the ion flight chamber is coaxial with the inlet port of the mass spectrometer, and the ion flight chamber is further provided with a number concentration sampling port which is communicated with the aerosol number concentration measuring device.

7. The system according to claim 1, wherein the system control device comprises a first data acquisition card, a second data acquisition card, and a controller module, the first data acquisition card is configured to collect chemical composition data measured by the mass spectrometer, the second data acquisition card is configured to collect particle size information and number concentration data of the nanoparticles measured by the aerosol number concentration measuring device, and the controller module obtains the number concentration and the chemical composition information of the nanoparticles with different particle sizes through a time-matching technique.

8. The system according to claim 2, further comprising one or more of the following:

A11) in the unipolar charging device, an inlet tube is communicated with the core sampling tube;

A12) in the unipolar charging device, an axial length of an inner tube is greater than an axial length of the inlet tube extending into the tube body;

A13) in the unipolar charging device, an axial spacing distance between the end of the inner tube adjacent to an outlet tube and the end of the outlet tube extending into the tube body is 9-11 mm;

A14) in the unipolar charging device, a vertical distance between the end of the inner tube adjacent to the outlet tube and dielectric barrier discharge electrodes is in a range of 9-11 mm;

A15) in the unipolar charging device, a vertical distance between ion trapping electrodes and the end of the outlet tube extending into the tube body is in a range of 9-11 mm;

A16) in the unipolar charging device, an inert gas is introduced through a discharge gas inlet, and the inert gas is helium;

A17) in the unipolar charging device, the dielectric barrier discharge electrodes are externally connected with a first power supply;

A18) in the unipolar charging device, the ion trapping electrodes are externally connected with a second power supply;

A21) in the first coupling transport device, an input end of a first transport inlet tube is in communication with an outlet port of the unipolar charging device, and an output end of the first transport outlet tube is in communication with an aerosol inlet of the nanoparticle electrical mobility size classification device;

A22) in the first coupling transport device, an integrated circuit experiment board comprises multiple resistors connected in serial, wherein the number of the resistors is the same as that of metal electrodes, and each of the resistors is connected with a corresponding metal electrode; one end of an integrated circuit experiment board is connected with the nanoparticle electrical mobility size classification device, and the other end of the integrated circuit experiment board is connected with the unipolar charging device and grounded;

A31) in the nanoparticle electrical mobility size classification device, an aerosol inlet is communicated with the first coupling transport device, and an aerosol outlet is communicated with the second coupling transport device;

A32) in the nanoparticle electrical mobility size classification device, a thickness of an upper electrode plate and a lower electrode plate is in a range of 0.1-1 cm;

A33) in the nanoparticle electrical mobility size classification device, a length of the upper electrode plate and the lower electrode plate that form a sheath gas channel is in a range of 20-30 cm, and a width of the upper electrode plate and the lower electrode plate that form the sheath gas channel is in a range of 3-5 cm;

A34) in the nanoparticle electrical mobility size classification device, a horizontal distance between a slit of the upper electrode plate and a slit of the lower electrode plate is in a range of 3-5 cm;

A35) in the nanoparticle electrical mobility size classification device, a width of the slit of the upper electrode plate for allowing aerosol to enter is in a range of 0.5-0.7 mm, and a width of the slit of the lower electrode plate for allowing aerosol to exit is in a range of 0.1-0.2 mm;

A36) in the nanoparticle electrical mobility size classification device, an inlet of the sheath gas channel which enables the sheath gas to enter an electrostatic classification region between the upper electrode plate and the lower electrode plate is a converging frustum, and the angle between the wall of the inlet of the sheath gas channel and the central axis of the sheath gas channel is in a range of 25-35°; an outlet of the sheath gas channel which enables the sheath gas to exit the electrostatic classification region between the upper electrode plate and the lower electrode plate is a diverging frustum, and the angle between the wall of the outlet of the sheath gas channel and the central axis of the sheath gas channel is in a range of 25-35°;

A41) in the second coupling transport device, an inlet of an ion flight chamber is coaxial with the aerosol outlet of the nanoparticle electrical mobility size classification device, and the inlet of the ion flight chamber is communicated with the aerosol outlet of the nanoparticle electrical mobility size classification device with the same inner diameter;

A42) in the second coupling transport device, the ion flight chamber is a particle transport tube, and the inner diameter of the ion flight chamber is in a range of 0.5-2 mm;

A43) in the second coupling transport device, a distance between the outlet of the ion flight chamber and an inlet of the mass spectrometer is in a range of 0.5-1.0 cm;

A44) in the second coupling transport device, a number concentration sampling port is located at a radial position of the ion flight chamber.

9. A method for analyzing the size distribution and chemical composition of neutral clusters below 3 nm, using the system according to claim 1, comprising:

1) setting a total flow rate and a core sampling flow rate in the sampling device, introducing nanoparticles into a main sampling tube of the sampling device, keeping the nanoparticles in a laminar flow state in a core sampling tube, and then transporting the nanoparticles to the unipolar charging device through a core sampling flow;

2) setting a discharge gas flow rate, a first power voltage, and a second power voltage in the unipolar charging device, forming a bipolar ion stream through the excitation of discharge gas molecules in a discharge gas under the action of the first power voltage, removing ions of one polarity from the bipolar ion stream to obtain a unipolar ion stream under the action of the second power voltage, enabling the unipolar ion stream to mix and collide with nanoparticles carried by the core sampling flow to obtain charged nanoparticles, and transporting the charged nanoparticles to the first coupling transport device;

3) reducing electrostatic loss of the charged nanoparticles by the first coupling transport device, and then transporting the charged nanoparticles to the nanoparticle electrical mobility size classification device;

4) setting a sheath gas flow rate and a third power voltage in the nanoparticle electrical mobility size classification device, performing classification of the charged nanoparticles in an electrostatic classification region between an upper electrode plate and a lower electrode plate under the action of a fixed flow field and an electric field formed by the third power voltage, and transporting the nanoparticles with a desired target electrical mobility size to the second coupling transport device;

5) transporting selected nanoparticles in the second coupling transport device respectively to the mass spectrometer and the aerosol number concentration measuring device for simultaneous measurement, determining the chemical compositions of the nanoparticles under a fixed mass spectrometry sampling flow rate in the mass spectrometer, and determining the number concentration of the nanoparticles in the aerosol number concentration measuring device under a fixed sampling flow rate;

6) performing matching among the particle size, number concentration, and chemical composition information of the nanoparticles by the system control device to obtain the number concentration and chemical composition information of the nanoparticles with different particle sizes.

10. The method according to claim 9, comprising one or more of the following:

B1) in step 1), a ratio of the total flow rate to the core sampling flow rate is no less than 5;

B2) in step 1), the core sampling flow rate is in a range of 5-10 L/min;

B3) in step 2), the discharge gas flow rate is in a range of 0.5-1.0 L/min;

B4) in step 2), the first power voltage is in a range of 2.0-3.5 kV;

B5) in step 2), the second power voltage is in a range of 1.0-1.3 kV;

B6) in step 2), a frequency of the unipolar charging device is in a range of 9-13 kHz;

B7) in step 2), when the charged nanoparticles are transported to the first coupling transport device, the bypass flow rate at an outlet of the unipolar charging device is in a range of 3-5 L/min;

B8) in step 3), in the first coupling transport device, a flow rate of the input charged nanoparticles is in a range of 3.0-5.0 L/min B9) in step 4), the sheath gas flow rate is in a range of 300-1500 L/min;

B10) in step 4), the third power voltage is in a range of −10-10 kV;

B11) in step 4), a particle size resolution of 1.47-nm particles is greater than 80;

B12) in step 5), the mass spectrometry sampling flow rate is 0.8 L/min;

B13) in step 5), the aerosol sampling flow rate is in a range of 1-2.2 L/min.

11. The system according to claim 8, wherein in A31) the aerosol inlet is in communication with the first transport outlet tube.

* * * * *